US006908587B1

(12) United States Patent
Balter et al.

(10) Patent No.: US 6,908,587 B1
(45) Date of Patent: Jun. 21, 2005

(54) POST CURE CORRECTION OF TIRE UNIFORMITY

(75) Inventors: David John Balter, Cuyahoga Falls, OH (US); Michael Alois Kolowski, Mogodore, OH (US); Anthony J. Scarpitti, Uniontown, OH (US)

(73) Assignee: The Goodyear Tire & Rubber Co., Akron, OH (US)

( * ) Notice: Subject to any disclaimer, the term of this patent is extended or adjusted under 35 U.S.C. 154(b) by 538 days.

(21) Appl. No.: 09/715,384

(22) Filed: Nov. 17, 2000

(51) Int. Cl.[7] .............................................. B29C 71/02
(52) U.S. Cl. ...................... 264/501; 264/40.1; 264/235; 264/346; 425/135; 425/446
(58) Field of Search ................................ 264/501, 502, 264/236, 237, 348, 235, 340, 346, 40.1; 425/58.1, 135, 445, 446; 73/146

(56) References Cited

U.S. PATENT DOCUMENTS

| | | | |
|---|---|---|---|
| 2,963,737 A | 12/1960 | Soderquist | |
| 3,039,839 A | 6/1962 | Waters et al. | |
| 3,120,571 A | 2/1964 | Wolfer | |
| 3,389,193 A | 6/1968 | Hughes | |
| 3,464,264 A | 9/1969 | French | |
| 3,529,048 A | 9/1970 | Kovac | |
| 3,605,182 A | 9/1971 | Ulm | |
| 3,632,701 A | * 1/1972 | Devitt et al. ............... | 264/40.1 |
| 3,635,610 A | 1/1972 | Hall et al. | |
| 3,725,163 A | 4/1973 | Hofelt, Jr. | |
| 3,792,145 A | 2/1974 | Hugger et al. | |
| 3,838,142 A | 9/1974 | Hochstein | |
| 3,848,368 A | 11/1974 | Toshioka et al. | |
| 3,865,527 A | 2/1975 | McGehee et al. | |
| 3,872,208 A | 3/1975 | Brown et al. | |
| 3,880,556 A | 4/1975 | Brown et al. | |
| 3,926,704 A | 12/1975 | Sharp, Jr. | |
| 3,945,277 A | 3/1976 | McGehee et al. | |

(Continued)

FOREIGN PATENT DOCUMENTS

| | | |
|---|---|---|
| DE | 1729614 | 6/1971 |
| DE | 2259653 | 6/1974 |
| EP | 0888872 | 1/1999 |
| EP | 1023987 | 8/2000 |

*Primary Examiner*—Mathieu D. Vargot
(74) *Attorney, Agent, or Firm*—Howard M. Cohn (57) ABSTRACT

Method and apparatus for post-cure correction (PCC), either partial or substantial, of various tire nonuniformities which have been detected during a tire manufacturing process by a tire uniformity machine (TUM), preferably testing a tire which has been nominally cooled down (i.e., nominally completed curing) after removal from a tire curing mold. The method comprises the steps of: (1) selecting the tire during a tire manufacturing process after the selected tire has been rejected by a tire uniformity test due to at least one tire uniformity defect; (2) providing 360 degree circumferential tread restraint which holds the tread in an ideal tread shape, concentric to the axis of rotation and nominally perpendicular to the equatorial plane; (3) sealingly holding the beads concentric to, and equidistant from, the axis of rotation, and symmetrically spaced about the equatorial plane; and (4) inflating the selected tire to a controlled pressure, and holding the controlled pressure for a controlled time while the tread is restrained and the beads are sealingly held. An optional additional step before the inflating step (4) comprises heating the selected tire, preferably to a controlled temperature above a glass transition temperature of the tire's ply cord material; and before the end of the controlled time cooling the selected tire below the glass transition temperature. The method steps can be repeated if the corrected tire is still rejectable as determined by a repeated TUM test. An apparatus (PCC device) is provided suitable for implementing the inventive method.

20 Claims, 6 Drawing Sheets

U.S. PATENT DOCUMENTS

| | | |
|---|---|---|
| 3,948,004 A | 4/1976 | Gruber |
| 4,095,374 A | 6/1978 | Ugo |
| 4,173,850 A | 11/1979 | Gormish et al. |
| 4,420,453 A | 12/1983 | Ayers |
| 4,458,451 A | 7/1984 | Rogers et al. |
| 4,628,978 A | 12/1986 | Imai et al. |
| 4,736,546 A | 4/1988 | Ugo |
| 4,767,480 A | 8/1988 | Goldstein |
| 4,935,054 A | 6/1990 | Rogers et al. |
| 5,022,186 A | 6/1991 | Rogers, Jr. |
| 5,060,510 A | 10/1991 | Rousseau |
| 5,225,138 A | 7/1993 | Irie |
| 5,365,781 A | 11/1994 | Rhyne |
| 5,384,084 A | 1/1995 | Siegenthaler |
| 5,441,393 A | 8/1995 | Fujieda et al. |
| 5,458,176 A | 10/1995 | Rhyne |
| 5,616,859 A | 4/1997 | Rhyne |
| 5,698,064 A | 12/1997 | Fujimoto |
| 5,853,648 A | 12/1998 | Cleveland |
| 5,879,484 A | 3/1999 | Spragg et al. |
| 5,882,452 A | 3/1999 | Sakamoto et al. |
| 6,203,748 B1 * | 3/2001 | Kumagai .................... 264/502 |
| 6,660,212 B1 * | 12/2003 | Balter et al. ................ 264/501 |

* cited by examiner

POST CURE CORRECTION OF TIRE UNIFORMITY

CROSS-REFERENCE TO RELATED APPLICATIONS

This application relates to U.S. patent application entitled CONSTRAINED POST CURE INFLATION Ser. No. 09/715,277, filed on Nov. 17, 2000, now U.S. Pat. No. 6,660,212.

FIELD

The present invention relates to nanufacturing pneumatic tires, and, more specifically, to a method and apparatus to improve or correct tire uniformity.

BACKGROUND

A typical radial tire includes a tread, a belt structure ("belts") and a carcass. The carcass has an innerliner, a pair of inextensible beads, an apex (rubber filler) over each bead, two sidewalls, and one or more plies ("radial plies"). The plies have parallel reinforcing ply cords of typically nylon or polyester, which extend between, and wrap around, the beads.

Tire Making Process

In the tire making process, a green carcass ("green" meaning as yet uncured and still tacky) is built typically by wrapping a length of green innerliner and at least one radial ply over a "first stage building drum" and splicing the innerliner and ply ends together to form a cylindrical shape around the building drum. Two beads (each comprising a cable of steel filaments encased in green rubber) are then positioned over the carcass, one at each side. The portions of the ply that extend beyond the beads are then turned up (wrapped around) the beads, forming "ply turnups". The resulting assembly, including the innerliner, ply, and beads, is called a green carcass. Then, green (uncured) sidewalls are applied around each side of the plies.

The green carcass is removed from the first stage building drum and mounted on a "second stage machine" where it is inflated to a toroidal shape, and its radially-outer surface is pressed against a green tread and belt package to form a "green tire". In subsequent steps, the green tire is "stitched" (rolled with a roller) to remove air pockets and adhere internal surfaces together.

The green tire is then mounted in a curing mold, where a bladder is blown up within the tire cavity to press the tire's outer surface tightly against the mold's inner walls while the tire is vulcanized. In the mold, the tire's green rubber initially softens under heat but eventually cures (stiffens through polymerization) enough to be removed from the mold and allowed to cool outside the mold, where the curing reaction continues until the tire is cool. In some cases, the tire is inflated on a post-cure inflation stand ("PCI stand") while cooling, to keep the tire shape uniform and the ply uniformly stretched, to prevent the ply from shrinking nonuniformly when the tire is still hot from the mold.

Uniformity Characteristics

After a tire is cured, it is typically tested for uniformity characteristics, such as radial runout, radial force variation, axial force variation, tangential force variation, and conicity, which are defined in the Definition Section hereinbelow.

Sources of Nonuniformity

Tire nonuniformity emanates from numerous factors in the tire making process, listed below in their order of occurrence in the tire building sequence:

Deformation Of Raw Components: The raw tire components (tread, sidewall innerliner, plies [ply cords], beads and belts) either are rubber or have a rubber matrix and are stored on long rolls in the deformable green state. So, the tire components may not remain uniformly thick during storage.

Nonuniform Placement On Building Drum: The ply cords may not be laid around the building drum with equal straightness and tension, and the two beads may not be positioned in a plane which is perfectly perpendicular to the drum (and tire) axis, or may otherwise not be parallel to each other over the ply on the building drum.

Nonuniform Placement On Second Stage Machine: On the second stage machine, if the belt and tread are not positioned symmetrically over the green carcass, the green tire, and hence the cured tire, will not be uniform. Also, later as the green rubber is blown up, the bead and ply positions can shift nonuniformly.

Components Shift In The Green Tire State: Before curing, the beads and plies are held in place only by their green rubber matrix and the surrounding green rubber. As the green tire is handled, the bead and ply positions can shift nonuniformly.

Nonuniform Mounting In The Mold: If the green tire is not positioned symmetrically within the mold, the finished tire will not be uniform.

Ply Splice: The ply is stiffer and heavier at its splice (where it is doubled due to the overlapping ply ends) compared to other locations.

Ply Stretching and Shrinkage: In the mold, the inflated bladder tensions (stretches) the ply outward, and heat shrinkage of the ply's nylon or polyester fibers tension the ply further. This tension (tensile stress) causes the ply to slip around the bead, but to a different extent at different locations around the bead, with a splice slipping around the bead least.

Nonuniform Curing: The rubber can "lock up" (stiffen under cure) around the ply at different times at different locations, thus locking in nonuniform ply stresses.

Turn Apparatus

After a tire is cured and cooled it is tested on a force variation machine (also called "tire uniformity machine", abbreviated "TUM", "tire uniformity inspecting machine", and "tire uniformity apparatus"). Many patents describe TUM components and TUM designs, almost all of which share the same general principle of operation as follows:

The tire is mounted on a rotatable test rim. To ease mounting, the test rim is a "split rim" having two rim halves with flanges that come together to sealingly engage the tire's bead area. The tire is inflated and pressed against a rotatable load drum (also called "load-wheel", "load roll" or "test drum") whose axis is parallel with the tire axis. As the tire rotates against the load drum, force sensors (usually connected to the drum shaft) or displacement sensors measure changes in force (of tire against the drun) or displacement (of the tire surface from the nominal or at-rest tire surface location) in various directions (mainly radial and axial).

TUM designs vary as to whether the load drum rotates the tire or vice versa, tire rotational speed, which uniformity characteristics are tested, how to correct for deformities or nonuniformities in the test rim or load drum, how to correct for sensor errors due to TUM vibration, and how to correct for tire imbalance. Designs also vary on rim design and tire conveyance mechanism.

Figure 4A:
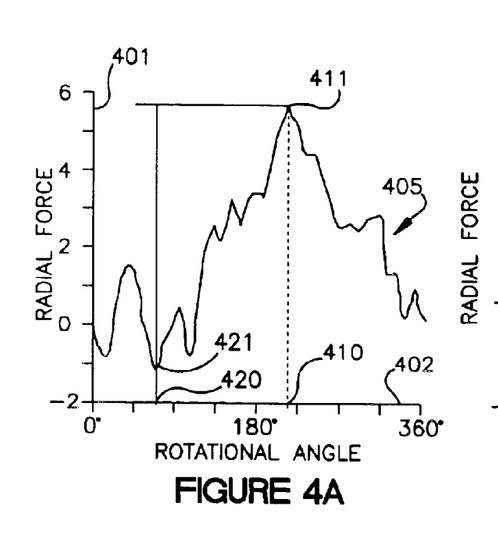
FIG. 4A is a graph of a composite signal output from a tire uniformity machine measuring radial force variation.
Figure 4B:
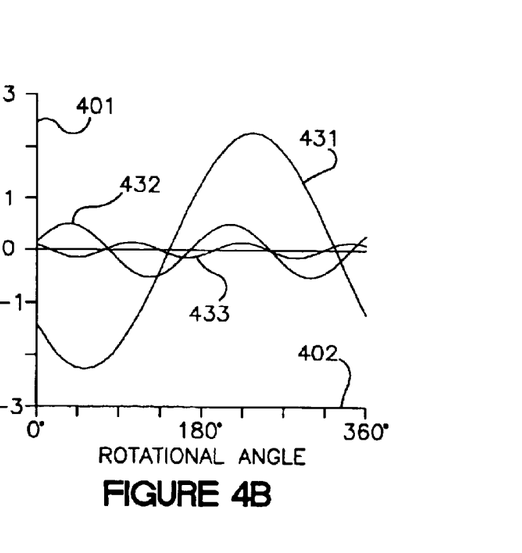
FIG. 4B is a graph of three harmonics derived by de-composing the composite signal of FIG. 4A.

FIGS. 4A and 4B illustrate simplified results of a TUM test, using radial force variation (RFV) as an example. FIGS.

4A and 4B show radial force on the vertical axis 401 versus the tire's rotational angle from 0 to 360 degrees on the horizontal axis 402. FIG. 4A shows a force variation composite curve 405. The angular location 410 (corresponding to a circumferential location on the tread) of greatest force 411 represents a "hard spot", where the tire presses hardest against the load drum. The angular location 420 of least force 421 represents a "soft spot", where the tire presses least against the load drum. The force variation composite curve 405 can be "decomposed" as shown in FIG. 4B into a series ("Fourier series") of constituent harmonic waveforms 431, 432, 433 for further mathematical analysis. The first harmonic 431 of radial force variation (abbreviated R1h) is also known as "radial runout." A second harmonic waveform 432 and third harmonic waveform 433 are also illustrated.

With the data thus collected, there are a wide variety of methods for mathematically processing the force variation data to determine the need for uniformity correction and to determine the control parameters for correcting a tire on a uniformity correction machine (which may be the same as the TUM used to make the uniformity measurements).

Prior Art Correction Methods

Grinding

In the patent literature, the most commonly addressed method of correcting a uniformity characteristic is grinding off rubber from selected locations around the tread circumference (and/or possibly the tread shoulder or tire sidewalls). Numerous patents disclose a wide variety of grinding techniques, differing on how the grinder is interfaced with the TUM, when grinding occurs relative to testing, where laterally on the tread (shoulder, crown, etc.) to grind, and how to calculate from force variation data the grinding depth at each angular location (U.S. Pat. Nos. 5,022,186; 4,936, 054; 4,736,546; 4,458,451; 4,173,850; 4,095,374; 3,948, 004; 3,880,556; and 3,848,368). Disadvantages of grinding are that it contributes to environmental pollution and material waste, reduces tread life, and leaves an unattractive surface finish. Although grinding can eliminate dimensional nonuniformities, it is less able to alleviate internal stress nonuniformities.

Work Out the Nonuniformities; Hot from mold; Inflated

U.S. Pat. No. 3,529,048 discloses a method to improve stress uniformity of tire cords and to reduce circumferential variations in structural resistance to radial and lateral forces when rotating. A tire is mounted on a rim shortly after removal from the vulcanizing mold while being approximately the vulcanizing temperature, and inflated to typically 20–40 psig. While the tire cools, the tire is rotated against an applied load for one to two times the vulcanizing duration. In variations of the invention, the load can be axial against the tread, lateral against the sidewall, or oblique against the tread, shoulder or sidewall. In other variations, the load can be rolling contact (such as a rotating shaft) or sliding contact. The load surface can be curved (ex: shaft) or planar (ex: floor), smoothly cylindrical or contoured. There can be one or a plurality of shafts (loads).

Rotatingly Pressing Around Tire's Entire Circumference When Hot

U.S. Pat. Nos. 3,635,610; 3,529,048; 3,464,264 and 3,389,193 disclose various methods to improve uniformity characteristics, all based on rotating a cured or partially-cured tire while pressing it against a roller, to "run in", "knead", and/or "buckle" the tire's surface around its entire circumference, to alleviate nonuniform stresses. The patents differ as to whether this is done when the tire is still hot from the mold, reheated, or made hot by flexural heating. They also differ as to whether this is done while the tire is inflated or uninflated.

Post-Cure Inflation

Various patented methods (e.g., U.S. Pat. Nos. 4,420,453 and 2,963,737) of improving uniformity of a cured tire are based on "post-cure inflation" ("PCI" or "post-inflation"), defined as mounting a hot cured tire (soon after removal from the curing mold, before it has cooled down from the curing process in the mold) on a rim and keeping it inflated as it cools. The patented methods differ as to the inflation pressure, whether to spray-cool, and when to start and end the post-inflation. Although these processes are referred to as "post-cure" processing, in reality a tire generally continues to cure as it cools down after removal from the curing mold.

Heating Selected Tire Portions While Uninflated

U.S. Pat. Nos. 3,945,277; 3,880,556; 3,872,208; 3,865, 527 and 3,632,701 disclose various methods of reducing nonuniformities and/or flat spots of a cured tire based on heating only selected portions of the tire while uninflated.

Rotating Uninflated After Molding

U.S. Pat. No. 5,853,648 discloses a device for cooling tires, which minimizes static stress. The tire is rotated in a vertical position, uninflated, while cooling after vulcanization.

Reduce Bead Spacing; PCI When Hot off the Mold

U.S. Pat. No. 3,039,839 discloses a method of solving tire shrinkage and distortion caused by shrinkage of nylon ply cords. The bead set (bead spacing when on a building drum) is narrowed (relative to the prior art) to increase the molding stretch during molding and impart a tire molding stretch to the cords. Upon removal from the mold, the tire is promptly mounted on an inflating rim (PCI stand) and kept inflated to typically 30 lbs until it cools to below the nylon cord's shrinkage temperature of about 200 F.

Ionizing Radiation

U.S. Pat. No. 3,838,142 discloses correcting radial force variation by irradiating soft-spot sections of the tread and/or sidewalls with ionizing radiation of high energy electrons.

Material Addition

U.S. Pat. No. 3,725,163 discloses reducing force variations by applying a small amount of adhering material to selected locations of the tread, which can be in the form of a spray or tape or applied by a marker.

Shims

U.S. Pat. No. 5,060,510 discloses correcting radial force variation by inserting circular ring wedges of circumferentially-variable thickness (serving as shims) between the rim and the tire's bead area.

Stretch Ply Cords

U.S. Pat. No. 5,365,781 (and its divisions U.S. Pat. Nos. 5,616,859 and 5,458,176) disclose a method and apparatus to correct uniformity characteristics in a cured radial tire by permanently deforming a portion of a carcass reinforcing member (i.e., selected ply cords) as a function of the magnitude of the uniformity characteristic. A significantly high inflation pressure permanently stretches the portion of the carcass reinforcing member beyond its elastic limit and permanently lengthens it to an extent that is inversely related to a restraint (applied by a pair of [sidewall] restraint rings [182 in FIG. 8]) at that location. Radial force variation and/or conicity may be corrected by varying the angles between the plane of each restraint ring and the plane of the tire sidewall and by applying differing amounts of restraint to the two sidewalls. A belt restraint ring (280 in FIG. 8) can be used to prevent the high inflation pressure from expanding the belt package. An alternate embodiment corrects force variation by mechanically (instead of by inflation pressure) stretching a portion of the carcass reinforcing member outwardly beyond its elastic limit.

Disadvantages of these methods are that the restraint rings are most capable of adjusting cord lengths for one hard spot and one soft spot which is approximately 180 degrees around the tire from the hard spot, however use of a cupped restraint ring (380) and multiple inflation pressure cycles is proposed for correction of composite radial force variation defects. Furthermore, the belt restraint ring can not force any kind of concentricity between the tread and the beads or the tire axis.

PCI With Variable Rim Width and Inflation Pressure

European Patent 888,872 discloses measuring a waveform of radial runout before vulcanization. In a first embodiment, immediately after vulcanization, the tire is post cure inflated (to elongate the ply cords) at a high temperature on a rim whose rim width is minimum at a location corresponding to the wave form peak. In a second embodiment, immediately after vulcanization, the tire is post cure inflated (to elongate the ply cords) at a high temperature, while restraining jigs are disposed against the tire shoulders (FIG. 10).

Pre-Cure Methods

Adjust Belt Position over Green Carcass: U.S. Pat. No. 3,926,704 discloses measuring conicity of a (green) unvulcanized tire and adjusting the location of the belts accordingly while on a tire building machine.

Adjust Tire Shaping when Green: U.S. Pat. No. 5,882,452 discloses measuring vertical deviation of a green tire from circularity while clamped on a green tire building drum, and then shaping the green tire into a complete circle according to the measured value.

U.S. Pat. Nos. 5,882,452 and 3,926,704 disclose methods of measuring and correcting nonuniformity before curing, and E.P. 888,872 discloses methods requiring measuring nonuniformity before curing. Such methods have the disadvantages of requiring uniformity measurement on each tire, requiring a corrective procedure that is specific for each tire, and the inability to detect/correct nonuniformities that arise during molding.

SUMMARY OF THE INVENTION

The overall object of the present invention is to provide both method and apparatus for post-cure correction (PCC), either partial or substantial, of various tire nonuniformities which have been detected during a tire manufacturing process by a tire uniformity machine (TUM), preferably testing a tire which has been nominally cooled down (i.e., nominally completed curing) after removal from a tire curing mold.

According to the invention, the method of post cure correction of tire uniformity is applied to a tire having beads, an axis of rotation, and a tread (the tread having an equatorial plane). The inventive method comprises the steps of:

1) selecting the tire during a tire manufacturing process after the selected tire has been rejected by a tire uniformity test due to at least one tire uniformity defect;
2) providing 360 degree circumferential tread restraint which holds the tread in an ideal tread shape, concentric to the axis of rotation and nominally perpendicular to the equatorial plane;
3) sealingly holding the beads concentric to, and equidistant from, the axis of rotation, and symmetrically spaced about the equatorial plane; and
4) inflating the selected tire to a controlled pressure, and holding the controlled pressure for a controlled time while the tread is restrained and the beads are sealingly held.

According to the inventive method, an optional additional step comprises heating the selected tire before the inflating step (4).

According to a feature of the inventive method including the optional heating step, wherein the selected tire has ply cords, the method further comprises: during the heating step, heating the selected tire to a controlled temperature above a glass transition temperature of the ply cord material; and before the end of the controlled time, cooling the selected tire below the glass transition temperature of the ply cord material. The controlled temperature may be between approximately 100 and approximately 300 degrees F., and/or the controlled temperature may be determined by a magnitude of one or more of the at least one tire uniformity defects.

According to a feature of the inventive method including the optional heating step, a location on the selected tire for heating during the heating step is determined by a location and type of one or more of the at least one tire uniformity defects.

According to a feature of the inventive method including the optional heating step, the controlled time and/or the controlled pressure is determined by a magnitude of one or more of the at least one tire uniformity defects.

According to the inventive method, the controlled pressure is determined by a magnitude of one or more of the at least one tire uniformity defects. The controlled pressure may be between approximately 20 and approximately 80 pounds per square inch gauge.

According to the inventive method, the controlled time is determined by a magnitude of one or more of the at least one tire uniformity defects. The controlled time may be between approximately 15 minutes and approximately 45 minutes.

According to the invention, the method may further comprise, after the inflating step (4), the steps:

5) repeating a tire uniformity test to determine if the selected tire is still rejectable;
6) repeating the method steps (1) through (4) if the selected tire is still rejectable; and
7) scrapping the selected tire if it is still rejectable after a pre-determined number of repeats of the steps (1) through (6).

According to the invention, an apparatus (a PCC device) is provided for implementing the inventive method, i.e., for post cure correction of tire uniformity for a tire having beads, an axis of rotation, and a tread having an equatorial plane; wherein the apparatus comprises:

a) means for providing 360 degree circumferential tread restraint which holds the tread in an ideal tread shape, concentric to the axis of rotation and nominally perpendicular to the equatorial plane;
b) means for sealingly holding the beads concentric to, and equidistant from, the axis of rotation, and symmetrically spaced about the equatorial plane; and
c) means for inflating the selected tire to a controlled pressure, and holding the controlled pressure for a controlled time while the tread is restrained and the beads are sealingly held.

According to the invention, the apparatus optionally includes:

d) means for heating the selected tire, and/or means for cooling the selected tire.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. The drawings are intended to be illustrative, not limiting. Certain elements in some of the drawings may be illustrated not-to-scale for illustrative clarity. For illustrative clarity, the cross-sectional views presented herein may be in the form of "near-sighted" cross-sectional views, omitting certain background lines that would otherwise be visible in a true cross-sectional view.

In the drawings, the hundredth's place of each reference number usually matches the figure number, and similar elements are usually referred to by similar reference numbers. For example, element 199 in FIG. 1 and element 299 in FIG. 2 might indicate corresponding or similar elements.

The same element appearing in different figures might be given the same reference number in all figures. In a single drawing, similar elements may be assigned the same number. For example, both beads of the same tire may be assigned the same number. In some cases, similar (including identical) elements may be referred to with similar numbers in a single drawing. For example, each of a plurality of elements 199 may be referred to individually as 199*a*, 199*b*, 199*c*, etc., and may be referred to in common as 199 or as 199*a*–199*c* (meaning 199*a* to 199*c*).

The structure, operation, and advantages of the invention will become further apparent upon consideration of the following description taken in conjunction with the accompanying drawings, wherein.

DEFINITIONS

Directions

"Axial" and "lateral" refer to the direction parallel to the tire axis.

"Circumferential" means extending around a circumference, and typically around the tire's circumference.

"Meridional" refers to a tire cross-section cut along a plane that includes the tire axis.

"Radial" and "radially" refer to directions radially outward from, and hence perpendicular to, the tire axis.

Tire Components

"Apex" is a cross-sectionally triangular elastomeric filler located radially outward from the bead.

"Bead" is generally an inextensible annular cable of steel filaments within a rubber matrix, for tightly securing the tire to the rim.

"Belt structure" or "belts" means two or more annular layers of parallel cords underlying the tread.

"Carcass" is the structure that generally includes the beads, plies, innerliner and sidewalls.

"Cord" is a reinforcement strand, including fibers, metal or fabric, with which the plies and belts are reinforced.

"Cure" means vulcanize.

"Equatorial Plane" is a plane perpendicular to the tire axis and passing through the center of the tread.

"Equator" is the line formed at the junction of the equatorial plane and the tread outside surface.

"Green" means comprising curable rubber that is as yet uncured.

"Innerliner" is an air-impermeable rubber layer forming the tire's inner surface.

"Ply" is a layer of synthetic or steel cords in a rubber matrix, that extends between and typically wraps around the two beads.

"Radial ply tire" means a belted or circumferentially-restricted pneumatic tire having a generally radial ply.

"Rubber" herein means "elastomer", which has (or has upon curing) rubbery properties.

"Shoulder" is a corner portion of a tire where the surfaces of the tread and sidewall meet.

"Sidewall" is a side portion of a tire between the tread and the bead.

"Tire axis" is the tire's axis of rotation.

Uniformity Characteristics

"Uniformity characteristic" is a measure of tire uniformity in a prescribed direction or plane which is measured under prescribed tire testing conditions.

"Dimensional nonuniformities" are asymmetries (nonuniformities) that are measurable when the tire is at rest.

"Dynamic nonuniformities" are asymmetries that are manifested when the tire is rotating.

"Radial runout" is a dimensional nonuniformity referring to the tread radius being asymmetric around its circumference (either out-of-round or not concentric around the tire axis).

"Radial force variation" is a dynamic nonuniformity referring to the tire's radial force being asymmetric around the tire's circumference, causing vertical vibration during driving.

"Lateral force variation" is a dynamic nonuniformity referring to the tire's lateral (axial) force being asymmetric around its circumference, causing lateral vibration (e.g., wobbling) during driving.

"Conicity" is a nonuniformity referring to the tread's meridional contour being asymmetric, causing a lateral (i.e., steering) force in the same lateral direction independent of the direction of tire rotation.

"Tangential force variation" is the nonuniform rotation of the tire's outer surface relative to the rotation of the tire's bead area.

DETAILED DESCRIPTION OF THE INVENTION

The present invention is intended to provide method and apparatus for post-cure correction (PCC) of various tire nonuniformities which have been detected by a tire uniformity machine (TUM) preferably testing a tire which has been nominally cooled down (i.e., nominally completed curing) after removal from a tire curing mold. The inventive methods/apparatus have been determined to be most beneficial for tires having polyester or other synthetic ply cords, especially in radial ply tires, but are also expected to benefit other tire constructions, and are therefore not limited in scope to any particular tire construction.

The inventive method will be described first, with reference to one or more embodiments of a PCC device (the inventive apparatus) according to the invention. Although the PCC device will be described in detail hereinbelow, a brief description will assist in understanding the description of the inventive method. The PCC device 140, 140' and portions thereof are illustrated in several different views in the drawings of FIGS. 1 to 3 (1, 1A, 1B, 1C, 2, 2A, and 3). Major features of the PCC device 140, 140' are a center post 131 with a central axis 137 (which is also an axis of rotation for the PCC device parts and a tire 120 which is placed into the PCC device 140, 140');

restraint segments 100, 100', tread plates 103, and bead rings 132, 133 having bead seats 135, 136 respectively. A tire 120 (also known as a "selected tire" since it has been selected for post-cure correction in the PCC device 140, 140') is illustrated in several of the drawings. The tire 120 generally has common features including beads 127, 128; sidewalls 125, 126; a tread 122 having shoulders 123, 124 and a belt package 129; and one or more plies 121 having ply cords (not shown).

Figure 5:
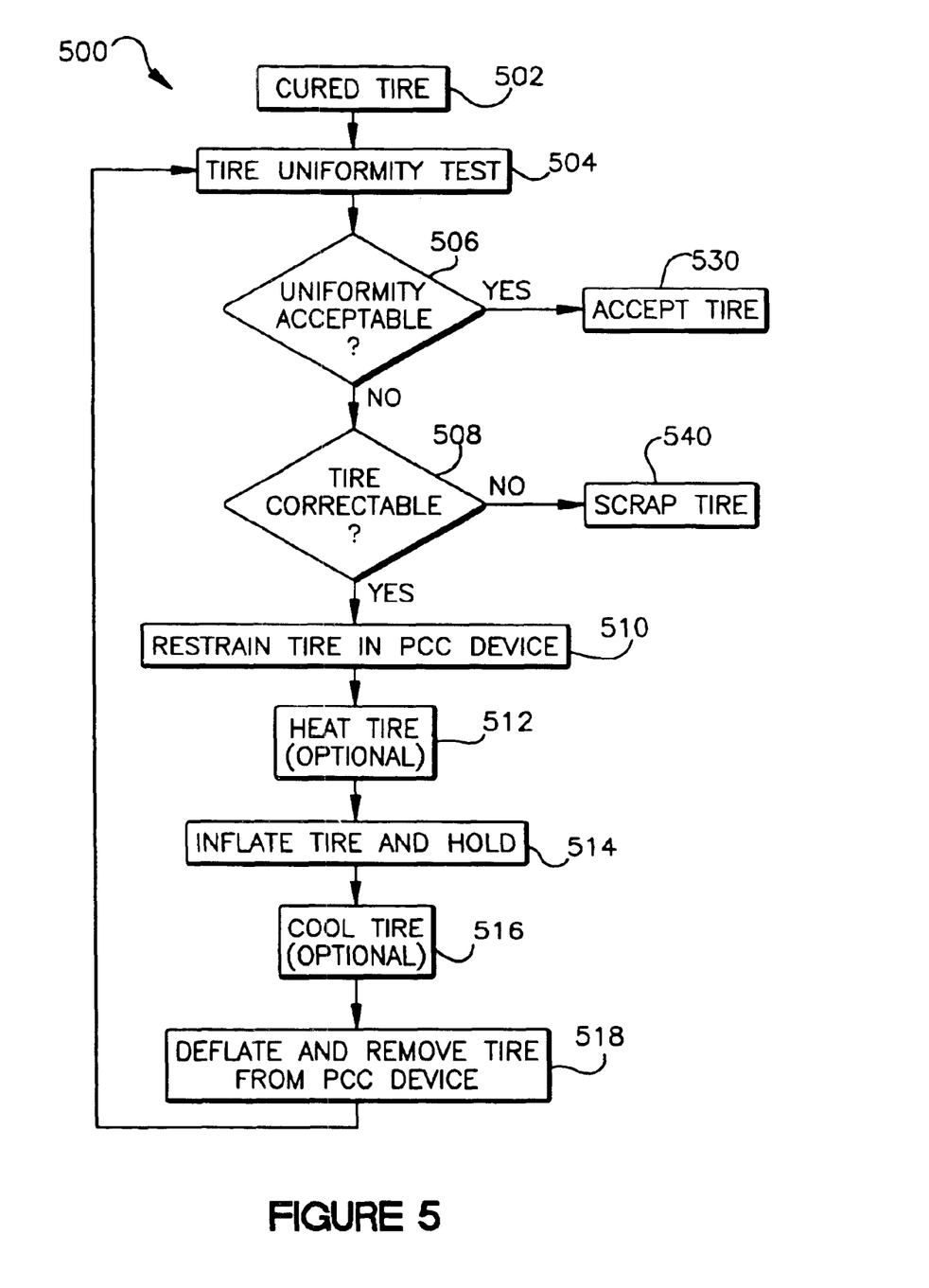
FIG. 5 is a flow chart for a method of post cure correction according to the invention.

FIG. 5 illustrates the inventive method 500 which describes a process wherein a nominally cured tire (starting step 502) is tested.504 in a tire uniformity machine ("TUM", not shown) which yields a variety of tire uniformity measurements (e.g., the radial force measurements illustrated by curves 405, 431, 432, 433 in FIGS. 4A–4B). If all of the tire uniformity measurements are within established acceptance limits (decision step 506), then the tire uniformity is considered acceptable, the tire is accepted 530 and thus leaves the process according to the inventive method 500 without needing any (further) post cure correction. In a well run manufacturing process, the majority of tires will follow this process path. If one or more of the tire uniformity measurements are not within established acceptance limits, then the tire is rejected by the TUM due to tire uniformity defect(s). In the decision step 508, secondary criteria are applied (by human or automated means) to determine if the rejected tire (uniformity) is correctable (substantially or partially) by means of the PCC device 140, 140' and method 500. The inventive method 500 is believed to substantially correct or at least improve (partially correct) any tire nonuniformity which is related to nonuniform ply stress and/or ply cord length, as opposed to balance problems such as nonuniform distribution of tire material, for example. Substantially or partially correctable tire nonuniformities include all harmonics of radial force variation, lateral force variation, conicity, and possibly tangential force variation. For reasons of manufacturing efficiency, secondary criteria may be devised which limit PCC to a subset of the correctable tire nonuniformities which may be most common and also relatively easily correctable by the inventive PCC method 500, such as runout (R1h, or first harmonic of radial runout), for example.

Figure 1:
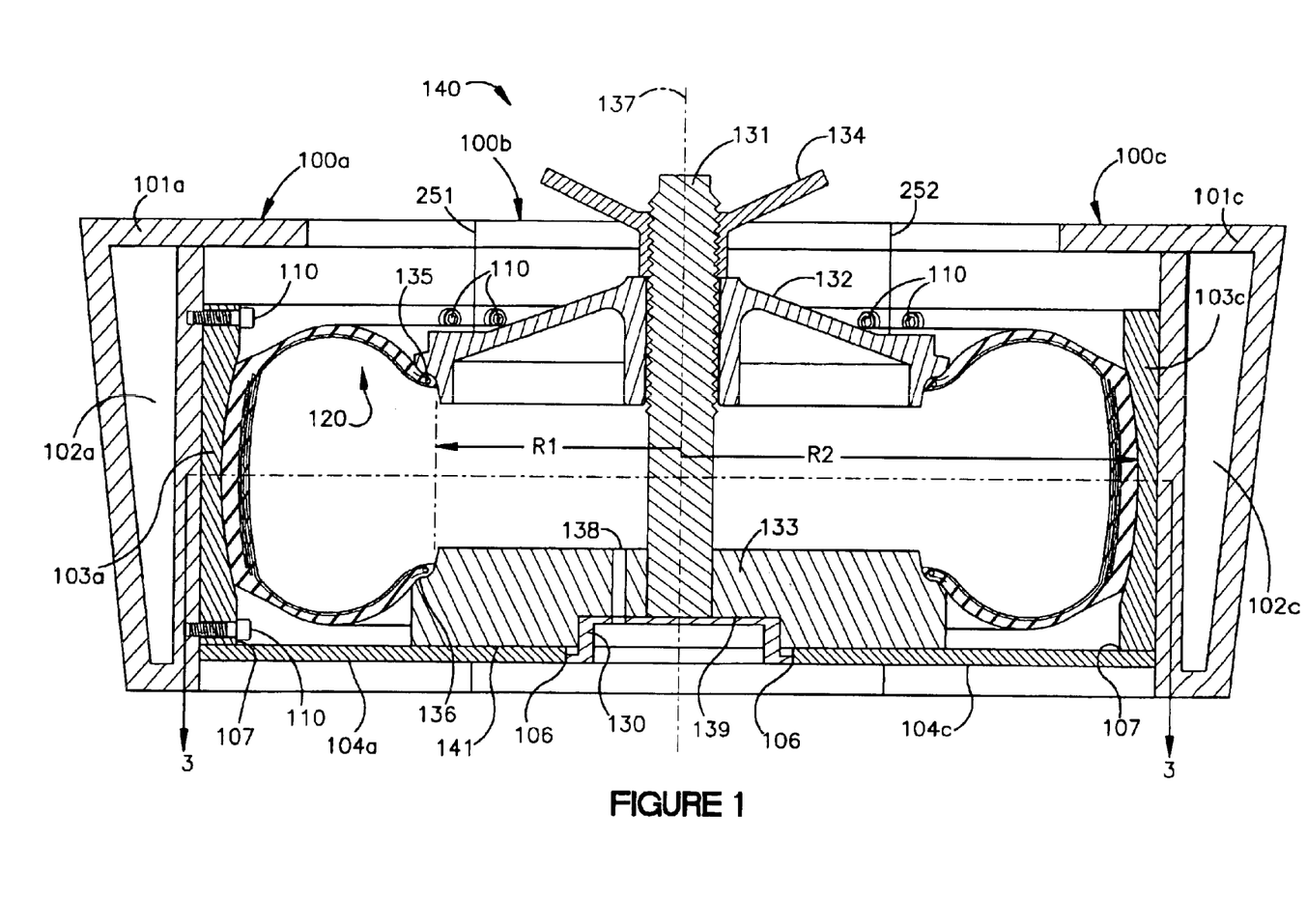
FIG. 1 is a cross-sectional side view of a tire in an embodiment of a post cure correction (PCC) device, taken along the line 1—1 shown in FIG. 2, according to the invention.
Figure 1A:
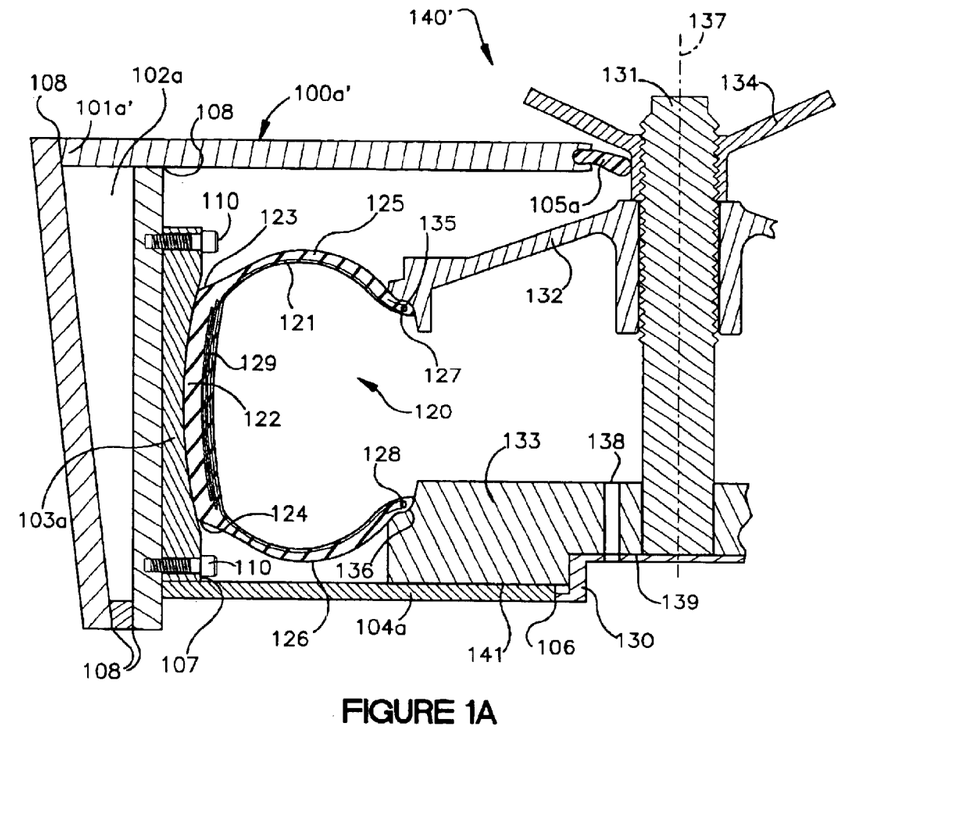
FIG. 1A is a near-sighted cross-sectional side view of a tire in a portion of a second embodiment of a PCC device, according to the invention.
Figure 1B:
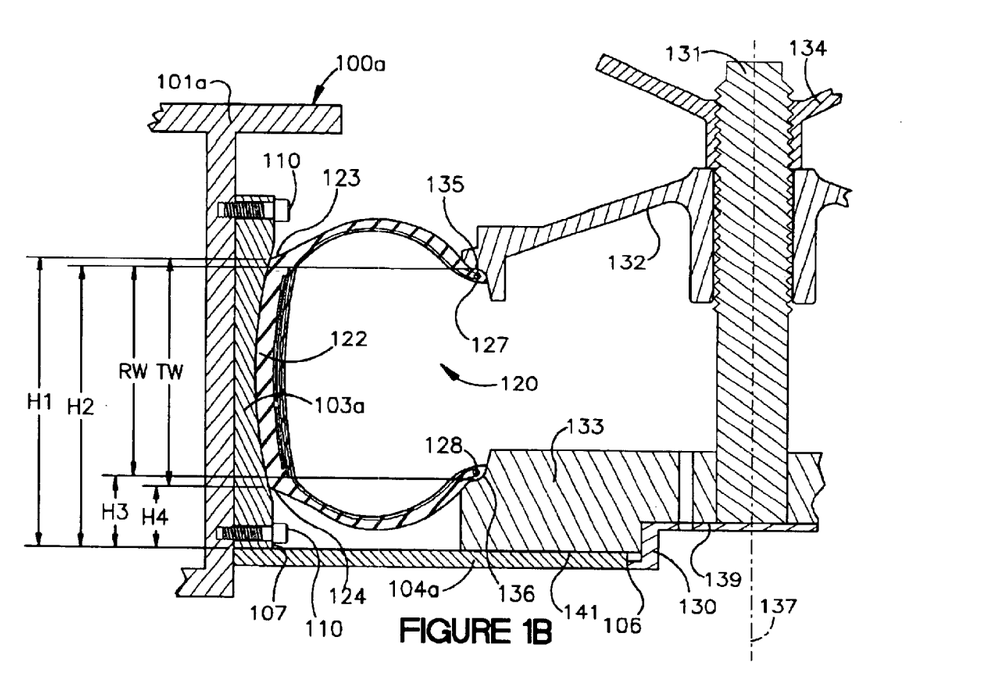
FIG. 1B is a near-sighted cross-sectional side view of a tire in a portion of the PCC device of FIG. 1, showing various dimensions, according to the invention.

In the decision step 508, the secondary criteria are used to either scrap 540 the rejected tire, deeming it uncorrectable, or to deem the rejected tire as correctable and thereby selecting the rejected tire (selected tire 120) for further processing in the PCC method 500 using an appropriate PCC device according to the present invention (e.g., device 140 in FIG. 1).

In step 510, a selected tire is placed into a restraining PCC device such as the embodiments 140 or 140' described hereinbelow. The PCC device 140, 140' must be suitably sized and adjusted to match the size and type of tire which is undergoing the PCC method 500. The main purpose of the PCC device 140, 140' is to facilitate inflating the selected tire against a 360 degree circumferential tread restraint (e.g., 103) which holds the selected tire's tread in an ideal tread shape, concentric to the selected tire's axis of rotation 137, and which simultaneously sealingly holds the selected tire's beads 127, 128 concentric to the selected tire's axis of rotation 137, and symmetrically spaced about the equatorial plane of the selected tire's tread. Individual ply cords in the plies 121 of the selected tire 120 may be different because they are of different lengths or because they possess different tensile/elastic properties, either of which will cause them to react differently when the tire is inflated in normal use. Inflation of the selected tire 120 in the PCC device 140 causes the plies 121 in the sidewalls to stretch freely under the same load, with radial growth limited to a constant radius by the tread restraint. Ply cords with different properties will stretch more or less to account for those differences, thereby normalizing the cord properties around the tire, and orienting the ply cords to a uniform loaded radius. The amount of inflation pressure is preferably controlled to a pressure value empirically determined to be most effective for any given tire 120. Likewise, the time span for holding the inflation at the controlled pressure is controlled to a time value empirically determined to be most effective for any given tire 120 at a given controlled pressure.

If the ply cords are heated before and/or during inflation in the PCC device 140, the ply stretching process is enhanced, particularly for synthetic ply cords including fibers such as polyester, for example. In the case of synthetic fibers, heating is preferably to a controlled temperature which is above the glass transition temperature of the fiber (e.g., between approximately 100 and approximately 300 degrees F.). Furthermore, by cooling the fibers back down below the glass transition temperature of the fiber before deflating the tire 120, the fibers (ply cords) should solidify with more or less permanently normalized stresses and properties.

Figure 1C:
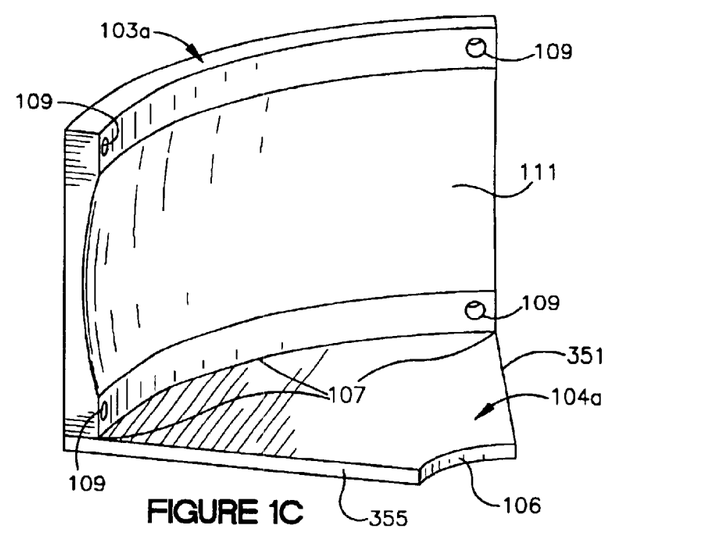
FIG. 1C is a perspective view of a tread plate and bottom plate assembly, according to the invention.

It should be noted that the ply cord properties are corrected for a loaded tire 120, i.e., a tire 120 which is under pressure and which is forced against a simulated road surface. This not only corrects nonuniform ply stresses, but also orients the tire 120 and cords to tune the footprint of the tire 120 at operating loads. Referring to FIGS. 1 to 1C (1, 1A, 1B, 1C), in order to simulate a road surface simultaneously pressing against the tire tread 122 at all points of the 360 degree tread circumference, the tread contacting surface 111 of the tread restraint (e.g., segmented tread plates 103 of the restraint segments 100) has an "ideal shape" which closely matches the ideal contour of the tread 122 of an inflated tire 120. The idea is to make the tread contacting surface 111 as flat as possible (like a road surface) but still touching the entire ground contacting (footprint) portion of the inflated tire's tread 122. The tread plate 103 surface 111 must match the typically curved contour of the inflated tire's tread 122, because in order to completely flatten the entire footprint area of the tread 122 simultaneously around the entire circumference, the tire belt package 129 would have to buckle circumferentially (such as when one squeezes a soda can). A further characteristic of the ideal shape for the tread 122 is that the tread 122 from shoulder 123 to shoulder 124 should be aligned properly with the beads 127, 128 around the entire circumference of the tire 120, i.e., the beads 127, 128 should be symmetrically spaced about the equatorial plane of the tread 122. Finally, the ideal tread shape has the characteristic of nominal perpendicularity to the equatorial plane, such that even if the tread 122 surface is slightly curved as explained hereinabove, the tread surface will be symmetric about the equatorial plane, with the tangent to the tread surface being substantially perpendicular to the equatorial plane where the equatorial plane intersects the tread surface(at the equator), and also the tread shoulders 123, 124 are radially equidistant from the tire axis of rotation (as are the beads 127, 128 which can be used to determine the tire's axis of rotation).

Thus, an optimum PCC process (including optional heating) is preferably to restrain (step 510) the selected tire 120 in the PCC device 140; heat (step 512) the tire 120 (preferably above the fiber's glass transition temperature); inflate the tire 120 and hold it at a controlled pressure for a controlled time (step 514); cool down (step 516) the tire 120 (preferably below the fiber's glass transition temperature) before the end of the controlled time; and then deflate and remove the tire 120 (step 518) from the PCC device 140. Exemplary controlled values are: controlled time between approximately 15 minutes and approximately 45 minutes; controlled pressure between approximately 20 pounds per square inch gauge (psig) and approximately 80 psig; and controlled temperature between approximately 100 degrees F. and approximately 300 degrees F. The controlled values are interrelated and generally are empirically determined optimum values for a given tire design. Furthermore, the controlled values can be adjusted as determined by a magnitude and/or type of tire uniformity defect (out-of-spec tire uniformity characteristic). For example, higher values of one or more of the three controlled values (time, pressure, temperature) may be needed to correct tire uniformity test defects with larger magnitudes (e.g., a higher radial force measurement for the peak 411 of the force variation composite curve 405 in FIG. 4A).

The heating step 512 is optional but generally preferred. If used, the tire heating 512 may take place either before or after placing the tire 120 into the PCC device 140, 140' and/or restraining the tire 120 in the PCC device 140, 140' (step 510). Tire heating 512 may also be delayed to occur during the inflation and hold step 514, either during the inflation or during the holding period. A variety of known techniques may be employed to heat the tire 120, for example: heating in an autoclave (the method used in the inventor's trials) or a microwave oven; inflating the tire 120 with steam or hot water, or introducing steam around the tire 120 while it is enclosed within the PCC device (e.g., 140' in FIG. 1A). Heating may even be only partial, such as heating the tread area 122 with a water/steam jacket (e.g., 102); or such as heating certain locations on the tire sidewall(s) 125, 126 and tread 122 wherein the location of heating on the tire 120 is determined by the location and type of the tire uniformity test defect. Such partial heating is accomplished by steam jets, for example.

The cooling step 516 is likewise optional, even if the tire 120 is heated. Preferably a heated tire 120 is cooled (either forced or allowed time to cool) to a certain temperature before the end of the controlled time of holding at pressure, but it may also be allowed or forced to cool after the tire has been deflated and/or removed from the PCC device 140, 140' (step 518). Forced cooling may be accomplished by a variety of known techniques, such as: cool air/water jets, or water jackets (e.g., 102 and/or the area within the walls of the PCC device 140').

Upon completion of the PCC steps 510 through 518, the selected tire 120 must be inspected to determine if the PCC process has sufficiently corrected the tire 120 to warrant accepting the selected tire 120. This is preferably accomplished by performing another tire uniformity test (step 504), and then if all of the tire uniformity measurements are within established acceptance limits (decision step 506), then the tire uniformity is considered acceptable, the tire 120 is accepted 530 and thus leaves the process according to the inventive method 500 without needing any further post cure correction. If the tire uniformity is not considered acceptable, then the subsequent decision step 508 is employed to decide if the tire 120 will benefit from further PCC (and if it is cost-effective to do so), or if the tire 120 should be simply scrapped (step 540).

In order to implement the inventive method 500 as described hereinabove; a PCC device 140, 140' must be employed, wherein the PCC device 140, 140' has certain characteristics (capabilities) which are the subject of the present invention, i.e., the inventive PCC device 140, 140'. The necessary characteristics are that the PCC device:

a) provides 360 degree circumferential tread restraint which holds the selected tire's tread in an ideal tread shape, concentric to the selected tire's axis of rotation and nominally perpendicular to the selected tire's equatorial plane;

b) sealingly holds the selected tire's beads concentric to, and equidistant from, the selected tire's axis of rotation, and symmetrically spaced about the equatorial plane of the selected tire's tread;

c) provides for inflating the selected tire to a controlled pressure, and holding the controlled pressure for a controlled time while the tread is restrained and the beads are sealingly held; and d) (optional) provides for heating and/or cooling of the selected tire, either as a whole or in part.

Figure 2:
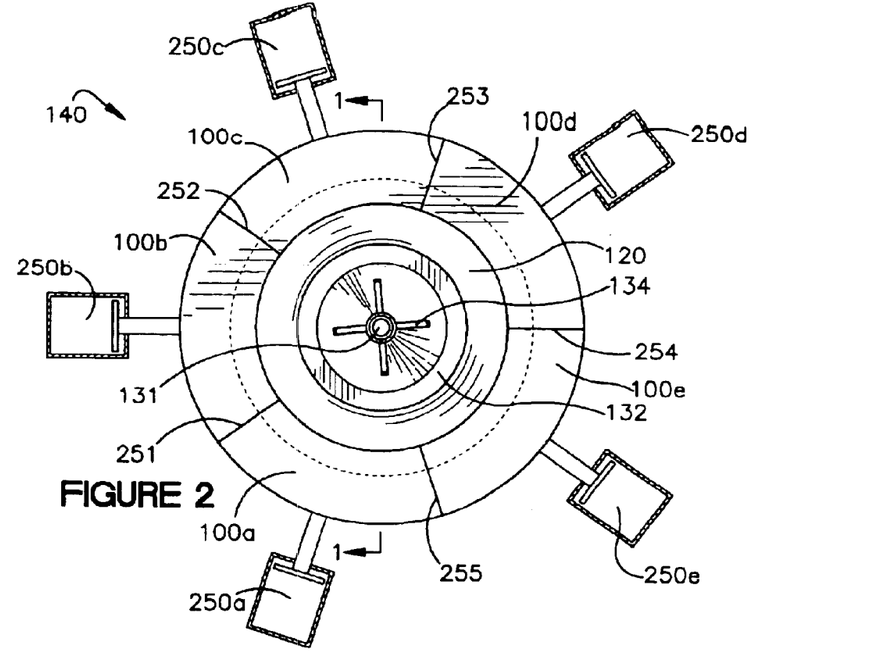
FIG. 2 is a perspective top view of the PCC device of FIG. 1, with the restraint segments closed, according to the invention.
Figure 2A:
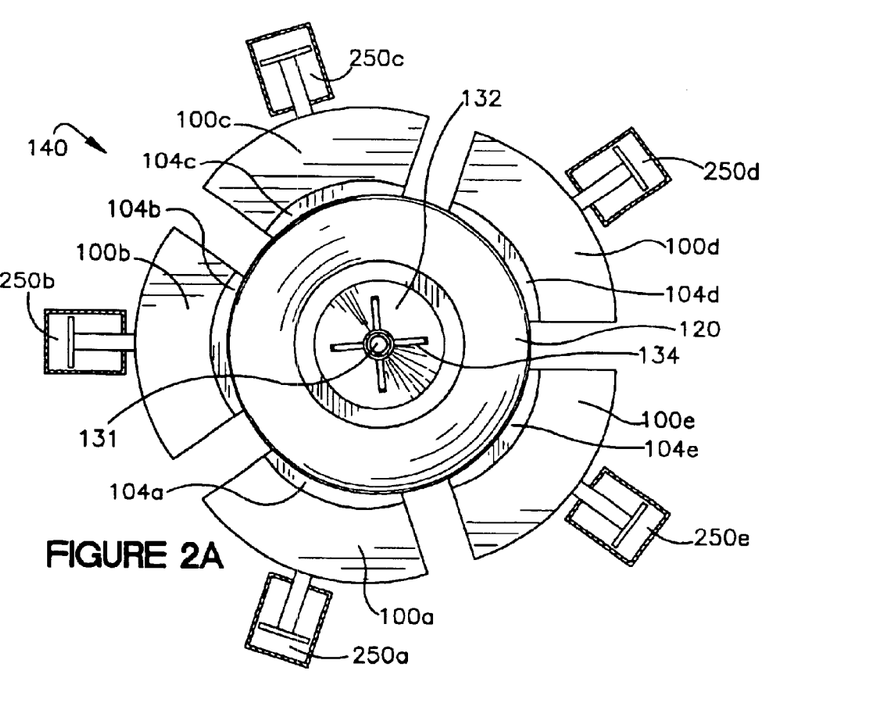
FIG. 2A is a perspective top view of the PCC device of FIG. 1, with the restraint segments opened, according to the invention.
Figure 3:
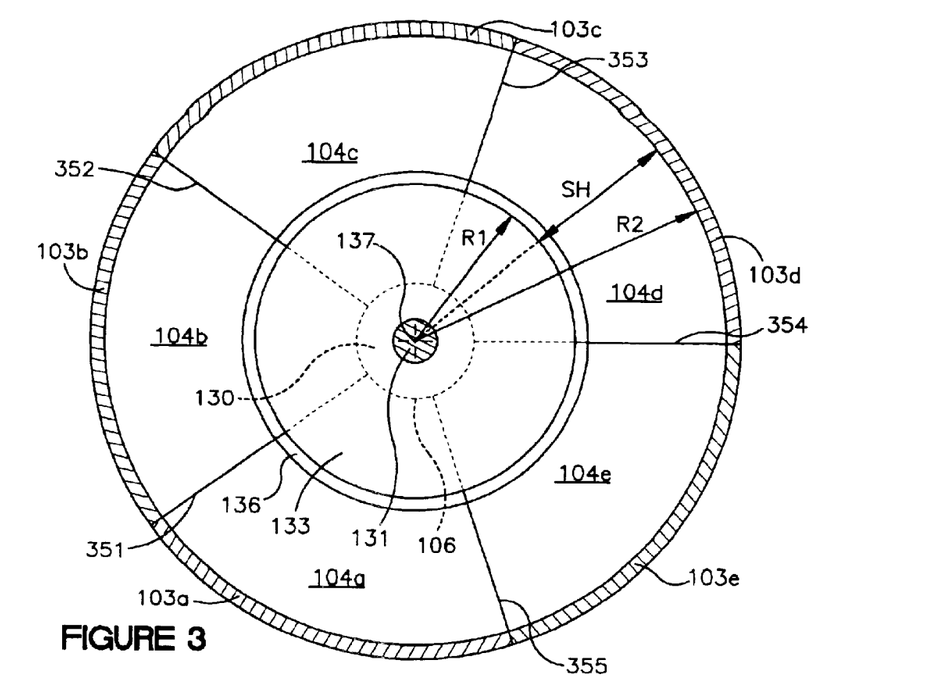
FIG. 3 is a cross-sectional top view of parts of a PCC device (tire removed), taken along the line 3—3 shown in FIG. 1, according to the invention.

Any apparatus (device) utilized for carrying out the steps of the inventive method 500, particularly if that apparatus has the certain characteristics (a) to (c) (optionally d) listed hereinabove, is considered within the scope of the present invention. An exemplary embodiment 140 and an exemplary alternate embodiment 140' are presented hereinbelow with reference to the drawings of FIGS. 1, 1A, 1B, 1C, 2, 2A, and 3 (FIGS. 1–3). Those skilled in the art may recognize that this embodiment is conveniently but not necessarily formed by modifying a Marangoni Retread Press, and will no doubt find other ways to fabricate a PCC device having the PCC device characteristics and capabilities listed hereinabove and therefore suitable for carrying out the steps of the inventive method 500 according to this invention. It should also be noted that the PCC device 140, 140' described herein is also well-suited for tire correction at other appropriate points in the tire manufacturing process. In particular, the PCC device 140, 140' can be used on tires after they are removed from a curing mold, preferably before the tires have been cooled down. Such a use would provide normalizing tire uniformity "correction" to all tires without first checking the tire in a TUM. This use would also nominally be "post cure" correction even though, as is known, the tire curing process generally continues after a tire is removed from the curing mold while it continues to cool down.

FIG. 1 is a cross-sectional side view of a tire 120 (the tire "selected" for PCC) in an embodiment of a post cure correction (PCC) device 140, taken along the line 1—1 shown in FIG. 2. FIGS. 2 and 2A are perspective top views of the PCC device 140 of FIG. 1. FIG. 2A shows the PCC device 140 opened so that the tire 120 may be inserted or removed from the PCC device 140, and FIG. 2 shows the PCC device 140 closed around the tire 120 as in FIG. 1, thereby restraining the tire 120. It can be seen that there are five restraint segments 100 (100a–100e; i.e., 100a, 100b, 100c, 100d, 100e) which join along joints: 251 (between segments 100a and 100b), 252 (between segments 100b and 100c), 253 (between segments 100c and 100d), 254 (between segments 100d and 100e), and 255 (between segments 100e and 100a). The restraint segments 100 are opened/closed by pistons 250 with each piston (e.g., 250a) dedicated to a corresponding restraint segment (e.g., 100a). The quantity of segments 100 (and pistons 250) is not important to the invention as long as there are enough segments to facilitate opening the PCC device 140, 140' sufficiently to allow insertion/removal of the tire 120. Since the tread restraint is intended to be around the full circumference of the tire (characteristic a), it is generally simpler to insert the tire into the restraint if the restraint opens up, such as the five-segment restraint 100 illustrated herein.

Referring to FIGS. 1–3, the restraint segments 100 (e.g., 100a, 100c shown in cross-section) have a rigid, preferably metal, frame 101 suitable for withstanding the forces employed in a PCC process (the steps 510–518 of the inventive method 500) without allowing any significant shape change or movement out of position for the restraint segments 100 during the PCC process. The frame 101 may have a chamber 102 (actually an artifact of the retread press) which can be used for heating and/or cooling of the tire 120 or at least the tire tread 122. As shown for the frame 100a' in FIG. 1A, the frame 100 can be fabricated from multiple pieces of metal which are welded together at joints 108. Comparing the frame 100a of the PCC device 140 in FIG. 1 to the frame 100a' of the PCC device 140' (alternate embodiment) in FIG. 1A, one can see that the major difference is that the frame 100a' extends farther than the frame 100a across the top of the PCC device 140', far enough to seal, by means of a gasket 105a (preferably rubber), against a center post 131, a locknut 134 and/or a top bead ring 132. Thus the PCC device 140' provides a sealed area surrounding the tire 120, thereby allowing heating and/or cooling media (e.g., steam, water, air) to be pumped around the tire 120 for heating and/or cooling purposes (optional characteristic (d)).

At the center of the PCC device 140, 140' is a post 131 which is fixed and provides a central axial reference line 137 which is also the tire 120 axis of rotation (also designated 137) when the tire 120 is properly mounted in the PCC device 140, 140'. The post 131 is affixed to a circular base 130 which is, in turn affixed to a rigid machine base (not shown). An upper surface 139 of the base 130 mates with a movable bottom bead ring 133 which slidingly fits over the post 131 and rests on the base 130 in a position which is registered radially by a close fit around the post 131, and is further registered vertically by resting on the surface 139 of the base 130. The bottom bead ring 133 is designed so that a bottom bead seat 136 is formed at a rim radius "R1" which is held concentric to the post 131. Likewise, a movable top bead ring 132 slidingly fits over the post 131, registered radially by a close fit around the post 131, and is designed so that a top bead seat 135 is formed at a rim radius R1 which is held concentric to the post 131. The vertical position of the top bead ring is controlled by a locknut 134 (threaded onto the post 131) which has means (such as a scale, not shown) for determining a fixed height suitable for a given tire 120, such that, when the tire 120 is inflated, the top bead ring 132 is pressed up against the locknut 134 (as shown) where the top bead ring 132 is held in position with a rim width "RW" measured between the top and bottom bead seats, 135 and 136 respectively. The bead seats 135, 136 are preferably shaped similarly to a rim suitable for the tire 120, are formed at a radius R1 (also a rim height) which is suitable for the tire 120, and are preferably spaced apart by the rim width RW which is approximately equal to the width of a rim generally used with the tire 120. There is an air passage 138 provided through the base 130 and bottom bead ring 133 to facilitate inflation of the tire 120, and suitable air seals (not shown) such as gaskets are provided between the bead rings 132, 133 and the post 131 so as to facilitate inflation of the tire 120. It can be seen that the central portion of the PCC device 140, 140' is designed to meet the specifications of characteristics (b) and (c) hereinabove.

In order to satisfy the remaining specifications of characteristics (a) and (b) hereinabove, a specially designed tread plate 103 is provided. Referring to FIGS. 1, 1A, 1B, 1C, and 3 and especially referring to the perspective view in FIG. 1C, each tread plate 103 (e.g., 103a) is preferably attached (by welds 107 for example) to a corresponding bottom plate segment 104 (e.g., 104a), and has mounting holes 109 as needed around the periphery of the tread plate 103 for securing, by means of bolts 110, the tread plate 103 to the corresponding frame 101 (e.g., 101a) of the corresponding restraint segment 100 (e.g., 100a). As seen in the FIG. 3 cross-sectional view of the bottom of the PCC device 140 (or 140'), each bottom plate segment 104 is bounded by radial edge lines which mate against adjacent bottom plate segments 104 along the appropriate bottom plate joints 351–355. It can be seen that there are five bottom plate segments 104 (104a–104e) which join along joints 351 (between segments 104a and 104b), 352 (between segments 104b and 104c), 353 (between segments 164c and 104d), 354 (between segments 104d and 104c), and 355 (between segments 104c and 104a). Particularly in the case of the PCC device 140', which is designed to confine heating and/or cooling media around the tire 120, the segment joints 251–255 and 351–355 are preferably designed to seal together appropriately when the PCC device 140, 140' is closed by the pistons 250. Another edge line for the bottom plate segments is the arc-shaped edge 106 which is shaped to mate against the circular periphery of the base 130. Thus the mating of the bottom plate segments 104 with the base 130 along the circular line 106 determines a stopping point (registration point) which is sized appropriately to place the tread plates 103 at a radial distance "R2" (measured at the equator) suitable for restraining the tread in the ideal shape. Each tread plate 103 has a tread-contacting surface 111 which has been described hereinabove as having an "ideal shape." It can be seen from the forgoing discussion that this ideal shape includes being placed at the correct radial distance R2 (measured from the axis of rotation of the tire 120 to the surface of the tread 122, at the equator, when the tire 120 is restrained in a "loaded" condition for the entire 360 degree circumference of the tread 122). The tread plates 103 are also designed so that when they are positioned at the radius R2, the tread plates 103 mate each one to each adjacent one so that the tread contacting surface 111 is substantially uninterrupted and continuous around the entire 360 degree circumference of the tread 122. Furthermore, the bottom plate segments 104, the registration point 106, the base 130, and the tread plates 103 are designed and sized specifically for a given tire 120 size so that the tread contacting surface 111 is concentric to the axis of rotation 137 and nominally perpendicular to the equatorial plane.

Finally, the bottom bead ring 133 is shaped such that the ring 133 bottom surface is substantially flat and mates with the top surface of the bottom plate segments 104 along a planar surface which thereby forms a registration point 141 for the relative vertical positioning of the bottom plate segments 104 versus the bottom bead ring 133. Since the bottom plate segments 104 are attached to the tread plates 103, the registration point 141 effectively controls the relative positioning of the tread plates 103 (including the tread contacting surface 111) versus the bottom bead ring 133. The construction of the PCC device 140, 140' is such that (for a tire 120 having a tread width TW measured between the two tire shoulders 123, 124): the bottom bead 128 is a distance "H3" from the registration point 141; the point where the tread width TW ends at the bottom tire shoulder 124 is held by the tread plates 103 (and generally curved tread contacting surface 111) at a distance "H4" from the registration point 141, thereby also holding the point where the tread width TW ends at the top tire shoulder 123 at a distance "H4" from the registration point 141; and the locknut 134 can be positioned so that the top bead 135 is caused to be a distance "H2" from the registration point 141, wherein the rim width "RW" resulting from subtracting distance H3 from distance H2 is symmetrically positioned relative to the tread width TW (i.e., H1 minus H2 approximately equals H3 minus H4), and preferably the rim width RW is substantially equal to the nominal rim width for a rim normally used with the tire 120.

The embodiments of the inventive PCC device 140, 140' described hereinabove are designed to carry out the inventive PCC method 500, thereby implementing the capabilities and characteristics (a) through (c) and optionally (d) described hereinabove. Although the PCC device 140, 140' may be operated manually, it is preferable to provide a controller (not shown) for at least partially automating the operation of the PCC device 140, 140'. Such a controller (e.g., a programmable logic controller "PLC") can be used to control the "controlled" times, pressures, and temperatures, for example. It can also automate the turning on/off of inflation air, heating steam, cooling water, and so on. The description hereinabove of controlled times, controlled pressures, and controlled temperatures assumes the presence of some sort of controller, whether it is a PLC or individual specialized controls as are well known in the relevant arts of machine and process control.

The described inventive method 500 and PCC devices 140, 140' provide advantages and benefits in post cure tire uniformity correction including correction of conicity as well as radial, lateral, and tangential force variation, and also including tuning of the footprint of a loaded tire. All uniformity defect corrections and footprint tuning are accomplished essentially simultaneously, and normally without needing to know the location or magnitude of the tire uniformity defect(s).

Although the invention has been illustrated and described in detail in the drawings and foregoing description, the same is to be considered as illustrative and not restrictive in character, it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. Method of post cure correction of tire uniformity for a tire having beads, an axis of rotation, and a tread having an equatorial plane; the method comprising the steps of:

selecting the tire during a tire manufacturing process after the selected tire has been rejected by a tire uniformity test due to at least one tire uniformity defect;

providing a 360 degree circumferential tread restraint which holds the tread of the tire in an ideal tread shape, concentric to the axis of rotation and nominally perpendicular to the equatorial plane, wherein the ideal tread shape closely matches the ideal contour of the tread of the tire when inflated;

sealingly holding the beads concentric to, and equidistant from, the axis of rotation, and symmetrically spaced about the equatorial plane; and inflating the selected tire to a controlled pressure, and holding the controlled pressure for a controlled time while the tread is restrained and a beads are sealingly held.

2. Method according to claim 1, further comprising the step of:

heating the selected tire before the inflating step.

3. Method according to claim 1, wherein the selected tire has ply cords, the method further comprising:

during the heating step, heating the selected tire to a controlled temperature above a glass transition temperature of the ply cord material; and before the end of the controlled time, cooling the selected tire below the glass transition temperature of the ply cord material.

4. Method according to claim 1, further comprising:

during the heating step, heating the selected tire to a controlled temperature between 100 degrees F. and 300 degrees F.

5. Method according to claim 1, further comprising:

during the heating step, heating the selected tire to a controlled tempera determined by a magnitude of one or more of the at least one tire uniformity defects.

6. Method according to claim 2, wherein:

a location on the selected tire for heating during the heating step is determined by a location and type of one or more of the at least one tire uniformity defects.

7. Method according to claim 2, wherein:

the controlled time is determined by a magnitude of one or more of the at least one tire uniformity defects.

8. Method according to claim 2, wherein:

the controlled pressure is determined by a magnitude of one or more of the at least one tire uniformity defects.

9. Method according to claim 2, wherein:

the controlled pressure is approximately equal to a normal inflation pressure for the selected tire.

10. Method according to claim 1, wherein:

the controlled pressure is determined by a magnitude of one or more of the at least one tire uniformity defects.

11. Method according to claim 1, wherein:

the controlled pressure is between 20 psig and 80 psig.

12. Method according to claim 1, wherein:

the controlled time is determined by a magnitude of one or more of the at least one tire uniformity defects.

13. Method according to claim 1, wherein:

the controlled time is between 15 minutes and 45 minutes.

14. Method according to claim 1, further comprising the step of:

after the inflating step, repeating a tire uniformity test to determine if the selected tire is still rejectable.

15. Method according to claim 4, further comprising:

repeating the method steps of claim 1 if the selected tire is still rejectable.

16. Method according to claim 5, further comprising:

scrapping the selected tire if it is still rejectable after a pre-determined number of repeats of the steps of the method of claim 15.

17. An apparatus for post cure correction of tire uniformity for a tire having beads, an axis of rotation, and a tread having an equatorial plane; wherein the apparatus comprises:

means for testing the tire during a tire manufacturing process and means for selecting the tire after the tire has been rejected by a tire uniformity test due to at least one-tire uniformity defect;

means for providing 360 degree circumferential tread restraint which holds the tread in an ideal tread shape, concentric to the axis of rotation and nominally perpendicular to the equatorial plane, wherein the ideal tread shape closely matches the ideal contour of the tread of the tire when inflated;

means for sealingly holding the beads concentric to, and equidistant from, the axis of rotation, and symmetrically spaced about the equatorial plane; and means for inflating the selected tire to a controlled pressure, and holding the controlled pressure for a controlled time while the tread is retrained and the beads are sealingly held.

18. Method according to claim 7, further comprising:

means for heating the selected tire.

19. Method according to claim 7, further comprising:

means for cooling the selected tire.

20. Method according to claim 1, further comprising the step of:

shaping the tread restraint such that it touches all of a footprint portion of the tread for orienting the tire and the ply cords to optimize a footprint shape factor.

* * * * *